UNITED STATES PATENT OFFICE.

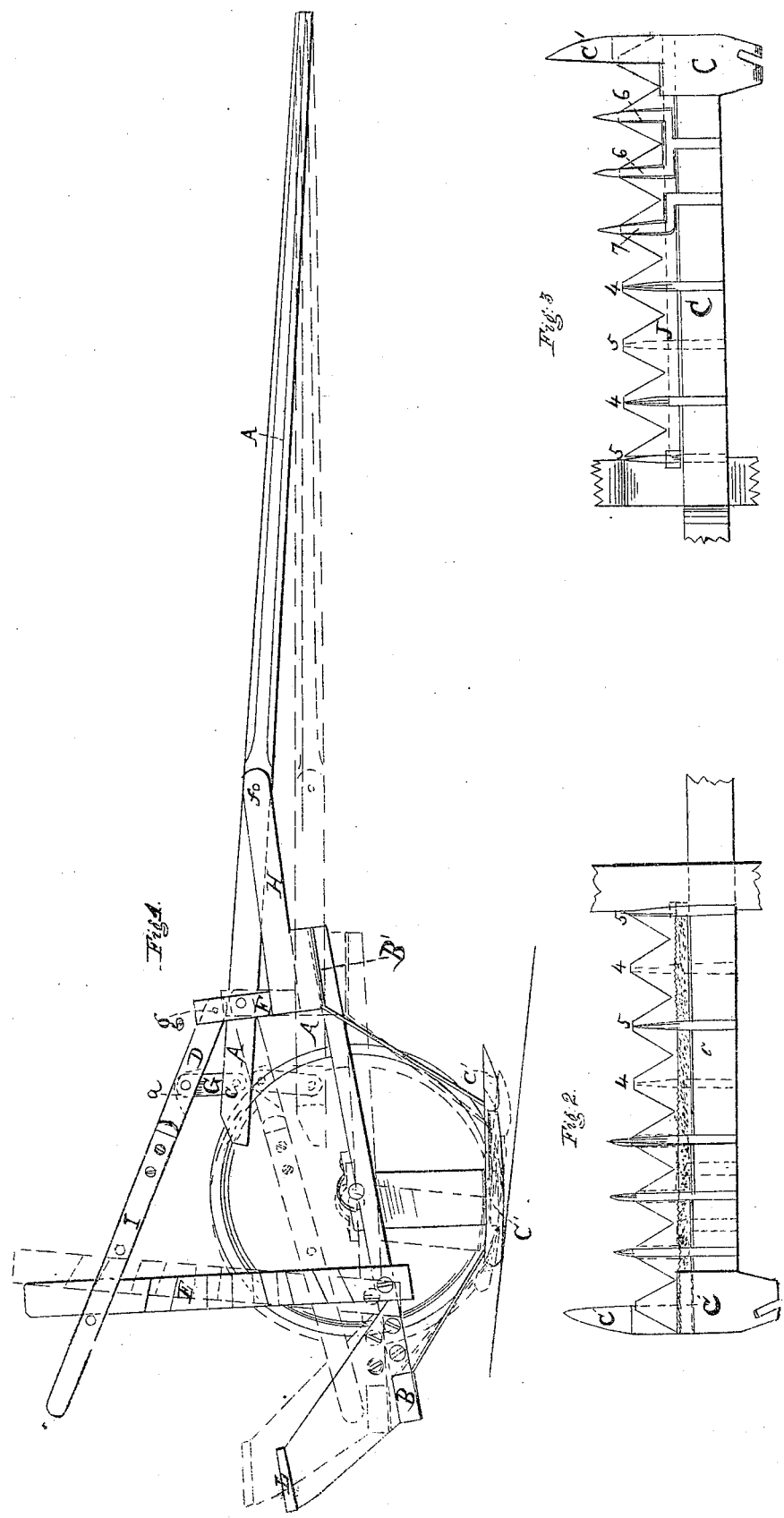

ABNER WHITELEY, OF SPRINGFIELD, OHIO.

IMPROVEMENT IN GRAIN AND GRASS HARVESTERS.

Specification forming part of Letters Patent No. 14,212, dated February 5, 1856.

*To all whom it may concern:*

Be it known that I, ABNER WHITELEY, of Springfield, in the county of Clarke and State of Ohio, have invented new and useful Improvements in Grain and Grass Harvesters; and I do hereby declare that the following is a full, clear, and exact description of the same, reference being had to the annexed drawings, forming part of this specification.

In constructing my machine I connect the main frame, from which the finger-piece is suspended, and tongue with a flexible joint, in connection with attaching the finger-piece and cutter to said frame in such manner that the finger-piece and cutters lie on the ground in or nearly in the vertical plane passing through the master-wheel shaft, so that when the end of the frame at said joint is elevated it will move the finger-piece forward and elevate the points of the fingers and cutters without moving the finger-piece off the ground, and when said joint is depressed the finger-piece will move backward and the points of the fingers and cutters will descend close to the ground again, and also means of elevating and depressing the front end of said frame at the option of the driver while the team is in motion. Now, it will be observed that this elevating of the points of the fingers and cutters causes them to ascend and pass over obstructions with ease, while at the same time the rear of the finger-piece resting on the ground forms a gage for the height of the stubble, and adapts it to the unevenness of the ground, causing it to cut the stubble of a uniform height. This adjustment becomes necessary in mowing meadows where strips of moist land occur, wherein crawfish-nests abound, and from the gravel therein it is necessary to avoid, as far as possible, cutting into them, and when that cannot be avoided and the top of the nest must be passed through the evil may be abated by the inclined position of the finger-piece, which passes the gravel and clay of the nest quickly off the blades, instead of remaining thereon until ground up and the edge of the blades ruined; and to further secure said blades from injury and render the cutting more easy and certain I make the tops or caps of the guards wider than the lower portions of the same, and so wide as to permit any gravel or small stones that may come into the cut to drop out of the cut without being brought against or supported by the lower part of the guard. I can thus cut over with ease and safety not only the above but other obstructions—as clods of earth, stones, &c.—at the will of the driver while the machine is in motion, and also throw the cutters and fingers down and cut good and clear grass close to the earth. This could not be done if the machine did not admit of an immediate adjustment without stopping the team, and to prevent clogging and at the same time give strength to the cap or top of the guard I make the caps double—that is, I connect the rear ends of two caps by a solid metal connection. The part forming said connection is so situated as to have its front edge extend over the rear of the cut, and its rear edge situated forward of the finger-piece, to which it is attached by a portion of said part extending backward from its rear edge to the finger-piece, and thence far enough into or on top of the finger-piece to permit it to be securely fastened to it, thus supporting the rear end of the cap firmly, while at the same time any straws or blades of grass or grain which may be carried through the slot by the blade are permitted to pass freely backward on one side of the guards, while that on the other side is held in its place until it is cut out by the rear portion of the cut. When made single the caps serve the same purpose and correspond with the double cap, having one side cut off; and, further, to improve the cutting, prevent clogging the knife in the shoe or divider, and make the machine more easily drawn through the grass or grain, and prevent dragging down a strip of grass or grain which is not cut, I make that part of the shoe which receives the end of the finger-piece in the usual manner, which is a little wider than the space through which the end of the cutter-bar is vibrated. This I make of the same width as far forward as the front edge of the cutter-bar, and furnish it with a groove to receive the cutter-bar with the cutter-blades on. This groove and the short cutter which I now use are the same as are secured to me by a former patent. Now, from this front edge of the cutter-bar forward I make the shoe of about half the width of the rear, and permit the end of the cutter to play out of and return into the divider in the groove in the manner described in a former specification; and instead of furnishing said shoe with a slot, as is usually done, I remove that portion of the shoe which forms the under part of said slot, and cause the cutter to cut against the top part, which forms the top of said slot, in the same manner as it does against my alternately-placed side fingers, and thereby permit any grass carried into the shoe by the end of the cutter to drop out when the end of the cutter is withdrawn. Thus the shoe is only half the width of the common shoe, and consequently requires less power to draw it through the grass and drags down less grass; and to again further avoid clogging I make the side of the cutter-bar opposite the one on which the blades are fastened a rasp having the points of the rasping so set as to pull or push out any straws or blades which may work back under the cutter-bar. I also make a part or all of the front edge of the bar a rasp or rough edge, and to prevent the points of the fingers next the coupling-box or any other of them carrying grass on them I terminate the points at or near the points of the blades, so as to permit the blades when vibrated to cut any grass that gets on them.

In the drawings, A is the tongue, passing through an upright slot in F, placed on the front portion, B, of the main frame B B', and extends back to a point near the line of the master-wheel shaft. The tongue A is pivoted at $f$ in the jaws or hounds H.

E is an upright post rising on the main frame between the front and rear portions, B B'. It is furnished with holding-notches for retaining the lever D. This lever is pivoted in F at $g$. C is the finger-piece, connected in the usual manner with the frame B B', and carries the fingers and cutters in common mode. The lever D has a spring, I, secured on its outside, which operates a staple passing through it and around the upright E, which spring and staple secure the lever D in the notches in E.

G is a metal or wooden bar connecting the rear end of the tongue and the lever D together, and is pivoted in A at $c$ and in D at $b$. Now, from the manner in which the lever D and tongue A are pivoted and connected, when the lever is depressed it will depress the front end of the frame B and with it the points of the fingers and cutters, and the rear B' will ascend, and is held in any desired position by the notches in E, and by elevating the lever D the reverse will be produced.

C' is the shoe or divider.
J is the cutter.
K is the cutter-bar, which is made a rasp, as described. 4 4 are upper side fingers, and 5 5 are the opposite, and are alternately placed with 4 4, and having their points terminate at the points of the blades.

6 6 is a double cap or top of two guards, and have their edges extending over the edges of the bottom portions of the same.

7 is a single one, made similar to the double ones.

In noticing the changes of position that the shoe, the cutters, and the fingers assume it must be borne in mind that the front end of the tongue is the stationary point. In the drawings the extreme elevation of the points of the shoe is shown; also the position of D at the top of E, together with the position of all the parts; and in red line is shown the greatest depression of the point of C' with the lever D locked down on the frame B B', together with the position of all the parts, and it will be readily understood how the intermediate changes may be made, as well as the facility given the driver, when seated on L, to quickly raise or depress the rear end of the lever D and effect the desired changes in the position of the finger-piece, cutter, &c.

I do not here claim oscillating the finger-bar about an axis within itself irrespective of the relations between the main frame and the master-wheel shaft; but I do claim—

So constructing the machine (as above described or otherwise, the result being substantially the same) that the driver is enabled, while the team is in motion and the master-wheel shaft being rigidly connected with the main frame, to change the angle of the fingers and cutters without moving the finger-bar from the ground.

In testimony whereof I have signed my name before two subscribing witnesses.

ABNER WHITELEY.

Witnesses:
  O. C. WILLSON,
  JOHN L. SMITH.